(12) United States Patent
Hegyi

(10) Patent No.: US 6,191,413 B1
(45) Date of Patent: Feb. 20, 2001

(54) LIGHT SENSOR WITH HOLLOW CONDUIT

(76) Inventor: Dennis J. Hegyi, 1708 Morton Ave., Ann Arbor, MI (US) 48104

( * ) Notice: Under 35 U.S.C. 154(b), the term of this patent shall be extended for 0 days.

(21) Appl. No.: 09/105,688

(22) Filed: Jun. 26, 1998

Related U.S. Application Data

(60) Provisional application No. 60/050,791, filed on Jun. 26, 1997.

(51) Int. Cl.[7] .................................. G02B 6/00; G01J 1/06
(52) U.S. Cl. .................... 250/227.11; 250/226; 385/12
(58) Field of Search ................... 250/226, 203.4, 250/227.11, 227.18, 227.21, 227.28, 227.29, 227.3, 214 AL; 385/4, 12, 31, 33

(56) References Cited

U.S. PATENT DOCUMENTS

| | | | | |
|---|---|---|---|---|
| 4,792,675 | * | 12/1988 | Laughlin | 250/227.28 |
| 5,402,508 | * | 3/1995 | O'Rouke et al. | 250/227.11 |
| 5,416,318 | * | 5/1995 | Hegyi | 250/226 |
| 5,416,336 | * | 5/1995 | Koivulehto | 250/548 |
| 5,528,358 | * | 6/1996 | Bjorkman et al. | 250/227.11 |
| 5,654,539 | * | 8/1997 | Brogos et al. | 250/227.11 |

* cited by examiner

Primary Examiner—John R. Lee
Assistant Examiner—Kevin Pyo
(74) Attorney, Agent, or Firm—Rohm & Monsanto, PLC

(57) ABSTRACT

An arrangement for detecting an electromagnetic energy such as ambient light is provided with a photodetector having an input for receiving electromagnetic energy, and an output for producing an electrical characteristic responsive to the electromagnetic energy. A hollow conduit having a first end is arranged to receive a portion of the ambient electromagnetic energy, and a second end thereof is arranged in the vicinity of the photodector input. Thus, a portion of the received potion of the ambient electromagnetic energy impinges upon the photodetector input. The first end of the hollow conduit is terminated at a predetermined angle with respect to an axis of the first end, and a diffuser is optionally disposed in the vicinity of the first end of the hollow conduit. A light blocker arranged in the vicinity of the first end of the hollow conduit to modulate the received portion of the electromagnetic energy, whereby the received portion of the electromagnetic energy has a magnitude that varies in response to the direction of incidence thereof with respect to the axis of the first end. The hollow conduit has a highly polished interior surface, or any other surface finish, and may be adapted to impart a predetermined spectral characteristic to the portion of the received portion of the electromagnetic energy that impinges upon same. The predetermined spectral characteristic corresponds, in certain embodiments, to a predetermined spectral response of a human eye.

29 Claims, 4 Drawing Sheets

LIGHT SENSOR WITH HOLLOW CONDUIT

RELATIONSHIP TO OTHER APPLICATION

This application claims the benefit of the filing date of United States Provisional Patent Application Serial No. 60/050,791 which was filed on Jun. 26, 1997, the disclosure of which is incorporated herein by reference.

BACKGROUND OF THE INVENTION

This invention relates generally to photodetector systems responsive to ambient light, and more particularly, to a photodetector system wherein the electrical output signal is responsive to the position of a light source with respect to a location distal from the photodetector.

In some light sensor arrangements, particularly of the type used in vehicles, it is desired that the direction of incident light be determined by a photodetector device located at a distance from the point at which the monitoring of the light is desired. It is desired that sunlight impinge upon a diffuser located about one and one half inches from the light sensor device.

The diffuser overlies a plurality of sensors each covering a respective zone of the field of view desired to be monitored. In an embodiment where four sensors monitor four respective zones, the sensors are tightly packed and each diffuiser and its corresponding light sensor employs a dedicated hollow tube, along which the light from the diffuser is propagated.

A significant problem is the transmission of a sufficient amount of light down the connecting tube that would reach the photodetector. The surface finish of the tube is very important. Initially, it would appear that a diffuse finish, which would scatter the incoming light in many directions, would effectively cause the light to be propagated along the hollow tube. However, by using a polished surface on the inside of the tube, the amount of light that reaches the photodiode is increase dramatically. A highly polished tube functions almost like a mirror. In fact, if the light were parallel to the tube, a perfectly polished surface would behave exactly like a perfect mirror. The phenomenon is called grazing incidence.

SUMMARY OF THE INVENTION

The foregoing and other objects are achieved by this invention which provides, in accordance with a first apparatus aspect thereof, an arrangement for detecting an electromagnetic energy. In accordance with the invention, there is provided a photodetector having a photodetector input for receiving electromagnetic energy, and a photodetector output for producing an electrical characteristic responsive to the electromagnetic energy. Additionally, a hollow conduit having a first end arranged to receive a received portion of the ambient electromagnetic energy, and a second end arranged in the vicinity of the photodector input, whereby a portion of the received potion of the ambient electromagnetic energy impinges upon the photodetector input.

In one embodiment of the invention, the first end of the hollow conduit is terminated orthogonal to an axis of the first end. A diffuser is optionally disposed in the vicinity of the first end of the hollow conduit.

In a further embodiment, the first end of the hollow conduit is terminated at an angle other than orthogonal with respect to an axis of the first end, whereby the received portion of the electromagnetic energy has a magnitude that varies in response to the direction of incidence thereof with respect to the axis of the first end. Again, a diffuser is optionally disposed in the vicinity of the first end of the hollow conduit.

In a still further embodiment, there is provided a light blocker arranged in the vicinity of the first end of the hollow conduit, whereby the received portion of the electromagnetic energy has a magnitude that varies in response to the direction of incidence thereof with respect to the axis of the first end. Again, a diffuser is optionally disposed in the vicinity of the first end of the hollow conduit.

In a highly advantageous embodiment of the invention, the hollow conduit has a highly polished interior surface. In a further embodiment, the hollow conduit has an interior surface that is adapted to impart a predetermined spectral characteristic to the portion of the received portion of the electromagnetic energy that impinges upon same. The predetermined spectral characteristic corresponds, in certain embodiments, to a predetermined spectral response of a human eye.

In a specific illustrative embodiment of the invention, the hollow conduit has length and radius dimensional characteristics that are predetermined to effect a desired combination of a first portion to of the received portion of the electromagnetic energy that impinges upon an interior surface of the hollow conduit, and a second portion of the received portion of the electromagnetic energy that propagates directly through the hollow conduit The hollow conduit is not limited to be cylindrical, or even to have a circular or otherwise continuous cross-sectional configuration. It may have a determined curvature or curvatures along its length.

In a multi-sensor embodiment of the invention, there is provided a further photodetector having a further photodetector input for receiving further electromagnetic energy, and a further photodetector output for producing a further electrical characteristic responsive to the further electromagnetic energy. Additionally, a further hollow conduit is provided having a respective first end arranged to receive a further received portion of the ambient electromagnetic energy. The further received portion of the ambient electromagnetic energy corresponding to ambient electromagnetic energy that is incident from a direction other than that which impinges upon the first end of the hollow conduit. A respective second end of the further hollow conduit is arranged in the vicinity of the further photodector input, whereby a portion of the further received potion of the ambient electromagnetic energy impinges upon the further photodetector input.

The hollow conduit and the further hollow conduit each have a respectively associated spectral characteristic in a specific illustrative embodiment of the invention.

In some embodiments, as previously discussed, a lens is disposed in the vicinity of the first end of the hollow conduit. The lens may be an annular lens having a determined angular sensitivity.

In accordance with a further apparatus aspect of the invention, there is provided an arrangement for detecting an ambient light. In accordance with this further aspect of the invention, there is provided a photodetector having a photodetector input for receiving the ambient light, and a photodetector output for producing an electrical characteristic responsive to the ambient light. A hollow conduit has a first end arranged to receive a received portion of the ambient light, and a second end arranged in the vicinity of the photodector input, whereby a portion of the received potion of the ambient light impinges upon the photodetector input. In addition, there is provided a light modulator disposed at the first end of the hollow conduit for imparting a directional sensitivity characteristic to the received portion of the ambient light.

In a specific illustrative embodiment of the invention, the light modulator is integrally formed with the hollow conduit, and may be in the form of a predetermined angular termination at the first end of the hollow conduit. Alternatively, or in conjunction with the angular termination, there may be provided a lens, illustratively an annular lens.

In other embodiments, the light modulator includes an axially protruding portion having an axial dimension that varies with angular position about an axis of the hollow conduit. Such a light modulator serves to impart an angular sensitivity characteristic to the apparatus of the invention.

The hollow conduit has an interior surface extending along at least a portion of its length, the interior surface having a predetermined surface finish. In some embodiments, the interior surface finish has a polished characteristic. In other embodiments, or in conjunction with polished internal surface portions, the interior surface finish has diffuse characteristic. In a specific illustrative embodiment of the invention, interior surface finish has a predetermined spectral characteristic. A diffuser is provided in some embodiments, arranged in the vicinity of the first end of the hollow conduit for dispersing the ambient light.

In accordance with a method aspect of the invention, there is provided a method of propagating ambient light from a first location to a second location where a photodetector is disposed. The method includes the steps of:

receiving a portion of the ambient light at a first end of a hollow conduit;

controlling an angular sensitivity of the received portion of the ambient light in relation to the hollow conduit;

propagating the received portion of the ambient light along the hollow conduit;

producing an electrical signal responsive to the received portion of the ambient light, after performing the step of propagating.

In one embodiment of this method aspect, there is further provided the step of modulating a spectral characteristic of the received portion of the ambient light during the step of propagating. In other embodiments, there is further provided the step of diffusing the received portion of the ambient light.

In a specific illustrative embodiment of the invention of this method aspect of the invention, there is provided, in the step of controlling, the further step of propagating the received portion of the ambient light through a lens.

In a further embodiment, the step of propagating the received portion of the ambient light along the hollow conduit includes the further step of causing received portion of the ambient light to impinge upon an internal surface of the hollow conduit. The proportion of the received portion of the ambient light that impinges upon the internal surface of the hollow conduit may be controlled.

BRIEF DESCRIPTION OF THE DRAWING

Comprehension of the invention is facilitated by reading the following detailed description, in conjunction with the annexed drawing, in which.

DETAILED DESCRIPTION

Figure 1:
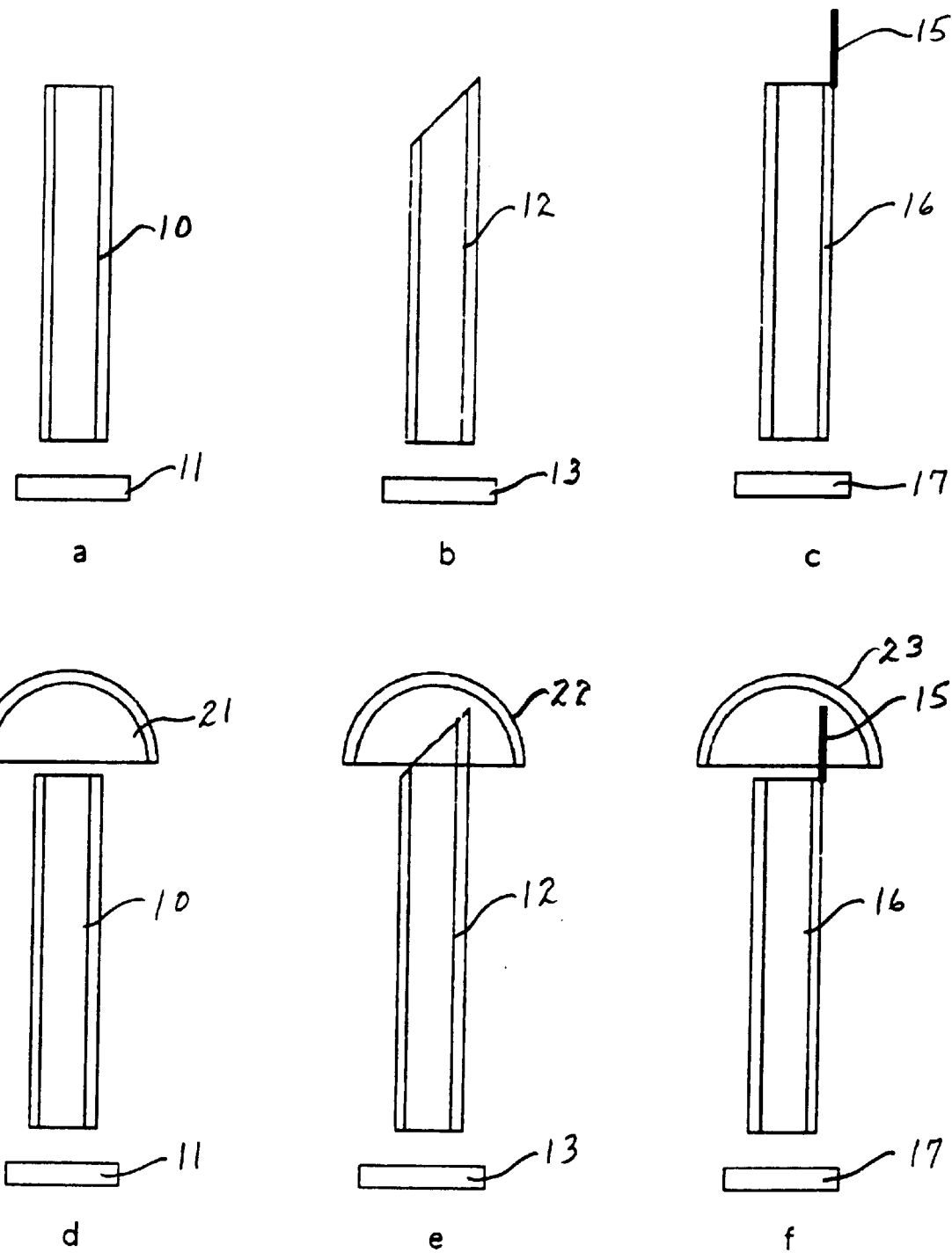
FIGS. 1a to 1f are simplified plan representations of respective hollow tube configurations with and without diffusers.

FIGS. 1a to 1f are simplified plan representations of respective hollow tube configurations with and without diffusers. The several devices can be used to obtain light sensors including sensors with to angular sensitivity using the concept of a polished tube. FIG. 1a shows a vertical tube 10, which functions as a hollow conduit, located above a photo detector 11. The purpose of the tube is to serve as a light guide. The interior walls of the tube are polished so that light is reliably reflected inside the tube.

Figure 2:
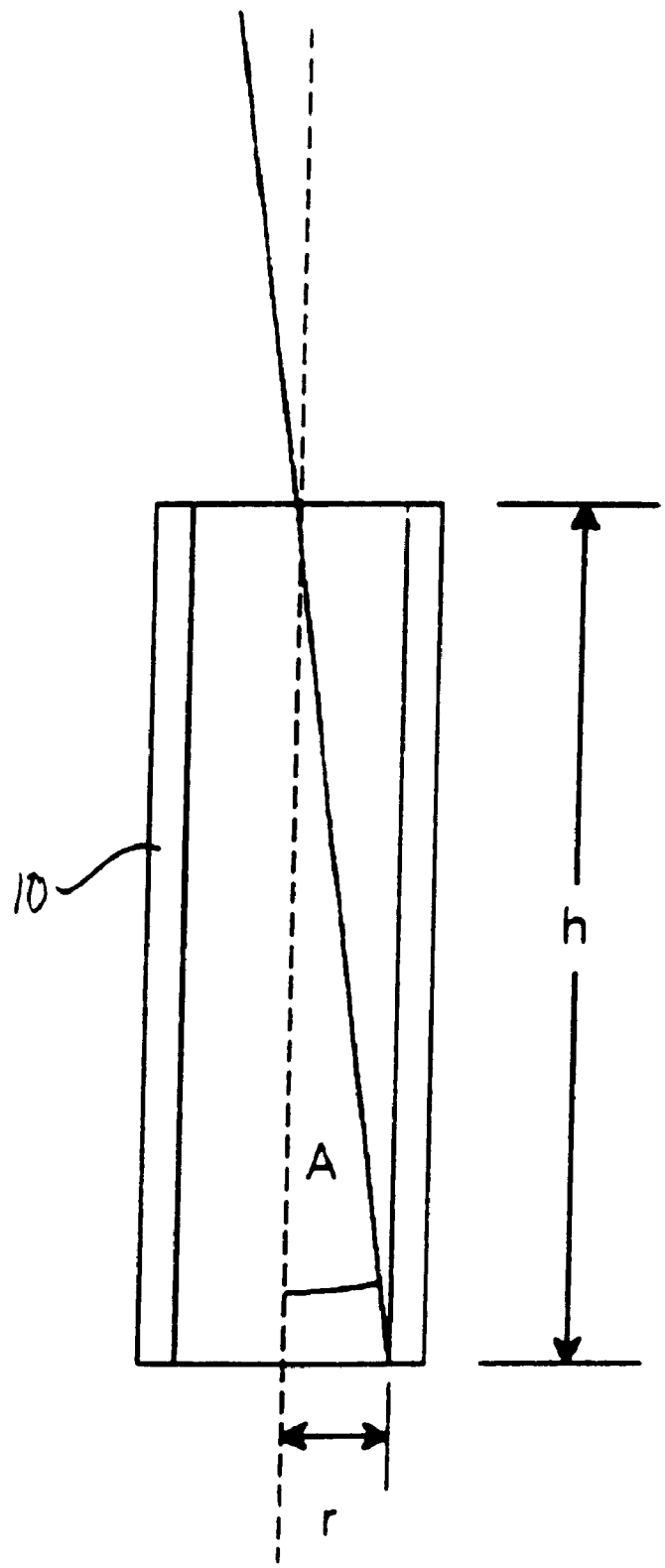
FIG. 2 is a simplified schematic illustration that is useful in explaining the angle of incidence of the light.

Referring for the moment to FIG. 2, depending on the ratio of the radius of tube 10, r, to the length of the tube, h, light can impinge upon the photodiode (not shown in this figure) without hitting the side walls of the tube. For example, if light starts out at the center of the tube with an angle A measured with respect to the axis of the tube such that:

$$A \leq \arctan\frac{r}{h}$$

the light can reach the photodiode without touching the walls of tube 10. On the other hand, if the light starts out with a steeper angle, it will hit the internal side walls. To stand the greatest chance of hitting the photodiode after several reflections from the walls, the walls of the tube should be as reflective as possible. This is because the reflectivity of a surface increases rapidly as the angle of incidence increases. (The angle of incidence is the angle between the normal to a surface and the direction of the incident ray.) When the light rays just skim the surface of an embodiment formed of plastic, the reflectivity approaches 100%. But, if the surface is not smooth so that the rays are diffusely scattered, light can be scattered back up the tube at each reflection so that it is much less likely for the light to reach the bottom of the tube where the photodiode is located. Thus as the tube gets longer relative to its diameter, the rays must bounce off the side walls more times before they hit the photodiode. Thus, it is more important to make the walls of the tube very highly polished so that the reflected rays reach the photodiode. In one embodiment, the tube used in a four zone sensor has a length that is several times its width.

The angular response of the system in FIG. 1a for a very highly polished tube is to have a response for a collimated light source (like the sun) that does not change rapidly as angle A increases from zero, but drops off to about 70% of its overhead response when the sun is 45° above the horizon, i.e., when A=45°. When the sun is on the horizon, the response drops to zero. In general, the response approximates cos A because the response depends on the amount of light entering the tube, which is proportional to cos A. Actually, it falls off faster than cos A because not all of the light that enters the top of the tube reaches the photodiode.

FIG. 1a is a representation of tube 10 with photo detector 11 illustrated schematically at the bottom. FIG. 1b shows a tube 12 that has been cut off at an angle so that it is more sensitive to light from the left. It has a photo detector 13 illustrated schematically at the bottom of the figure. Similarly, FIG. 1c achieves the same effect by using a blocker 15 on the top right-hand side of a tube 16, which is arranged, in this figure, to overlie photo detector 17.

FIG. 1d shows a tube 10 with a diffuser 21 disposed over it. Adding a diffuser to the tube increases the angular acceptance angle of the system; i.e., it no longer goes to zero response when the light source is on the horizon. With a diffuser, the light detecting system can detect light coming from the horizon even though the detector is pointed straight up. Another reason to include a diffuser is that the system will have a smoother response to a light source moving from overhead to making an angle with respect to the axis of the tube. The exact angular response of the system depends on the shape of the diffuser. For example, hemispherical diffuser 21 shown in the illustration has a response with the sun overhead which is about twice as large as when the sun is on the horizon; when the sun is overhead the area of the diffuser that is illuminated by the sun is a circle of radius r where r is the radius of the diffuser. When the sun is on the horizon, the projected area of the diffuser in the direction of the sun is one-half of a circle of radius r. That is, the area of the diffuser illuminated by the sun on the horizon is half the area of when the sun is overhead. But, to determine the response of the whole system to light, the transmission of the tube as a function of the angle of the incident light must be taken into account. When the sun is on the horizon, it only illuminates half of the diffuser so that relative to a position with the sun overhead, more light must make a larger angle (larger A) going down the tube. Since the response of the tube will decrease with large A, the response of the system will be less than 50% of the overhead when the sun is on the horizon.

FIG. 1e illustrates another way of making the diffuser arrangement sensitive to light from a particular direction. In this figure, tube 12 has a diffuser 22 arranged over the angled end portion. FIG. 1f accomplishes the same goal by arranging a diffuser 23 over blocker 15 of tube 16.

Figure 3:
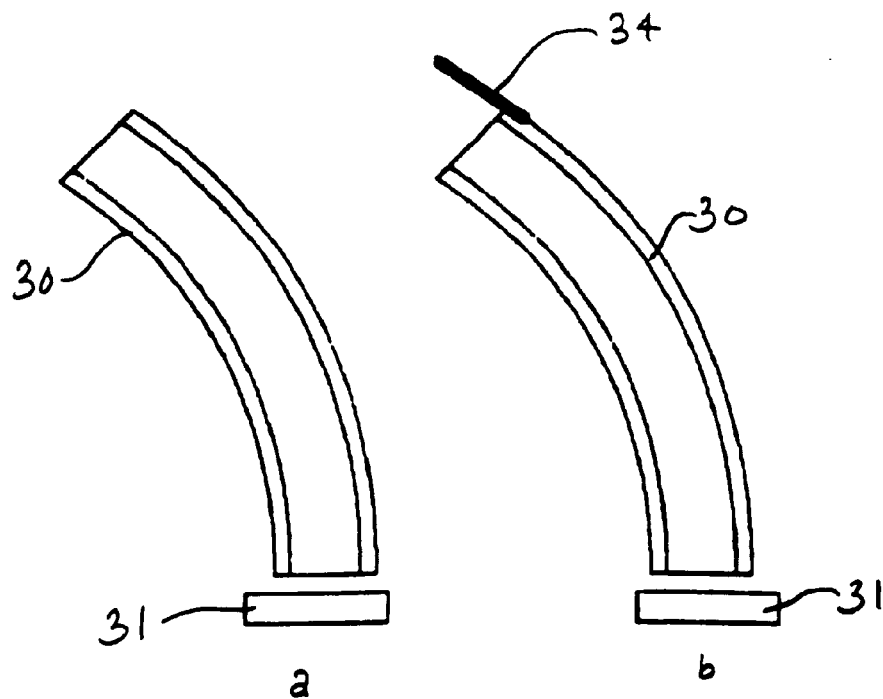
FIGS. 3a and 3b are simplified schematic illustrations of curved hollow tube arrangements.

FIG. 3a shows another way of making a light detector system achieve angular sensitivity. As shown a curved hollow tube 30 is arranged to have an end thereof in the vicinity of a photo detector 31. In FIG. 3b, the addition of a blocker 34 affords greater control over the directional sensitivity of the incoming ambient light.

Figure 4:
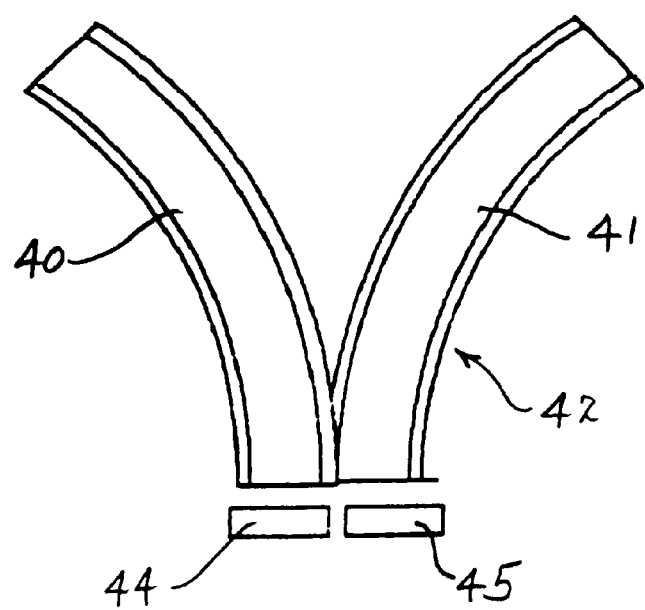
FIG. 4 is a simplified schematic illustration of a curved hollow multi-tube arrangement where the tubes are directed in opposing directions.

As shown in FIG. 4, two curved tubes 40 and 41 are combined to make a detector system 42 that achieves an angular response to ambient light that is appropriate for use as a dual zone automobile climate control system (not shown). In this specific illustrative embodiment of the invention, each of curved hollow tubes 40 and 41 is terminated in the vicinity of an associated one of photo detectors 44 and 45. For example, one side of system 42 would have an output that is indicative of the solar heating that a driver experiences and the other side would have an output indicative of the solar heating that a passenger experiences. Four tubes (not shown) are to be employed in an automobile (not shown) to achieve a four-zone climate control system. The principal advantage of the curved tubes in these applications is that all the photo detectors can be mounted on a single circuit board, or it is possible to use a single monolithic detector divided into four regions of sensitivity for this device. If four detectors were used with straight tubes each tipped in a different direction to achieve a four zone solar sensor response pattern, it would take four separate detectors which would be considerably more expensive to manufacture.

Figure 5:
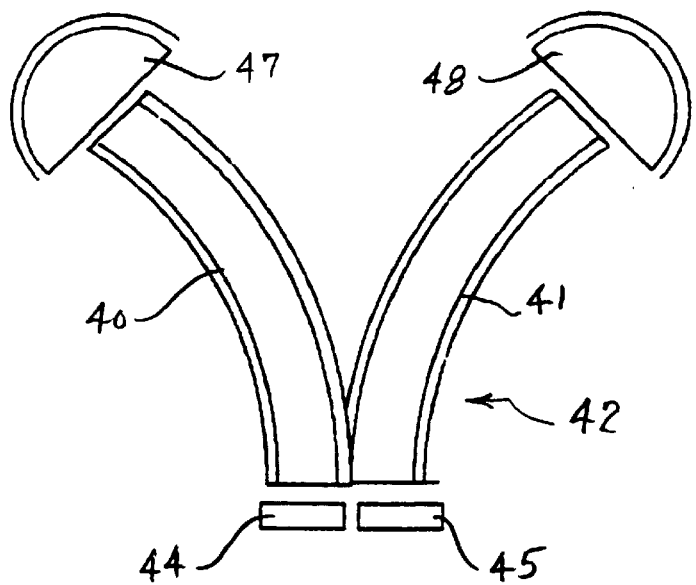
FIG. 5 simplified schematic illustration of a curved hollow multi-tube arrangement where the tubes are provided with diffusers and are directed in opposing directions.

FIG. 5 shows detector system 42 of FIG. 4 with diffusers 47 and 48 installed respectively thereon. Thus, the curved tube system is enhanced with all the previously described advantages associated with the use of diffusers.

There is a significant advantage that can be achieved by using a tube that is curved enough so that light cannot go directly from the opening of the tube to the photodetector without striking the side walls of the tube. That is, it is possible to achieve a particular spectral response without using a filter or a diffuser with particular spectral properties. Because the light that travels down a curved tube must strike the side walls many times before it reaches the light detector, the only light that will reach the light detector is light that is reflected by the walls of the tube. Tubes with green walls, for example, made with green plastic, would preferentially transmit green light. In particular, if the walls of the tube were made from an appropriately chosen green dye, chosen to match the spectral response of the human eye, i.e., the C.I.E. response, the sensor could be used to construct a light sensor that would match the spectral response of the human eye to light and would achieve all of the advantages of a system with a C.I.E. filter or of a diffuser with a C.I.E. response.

Figure 6:
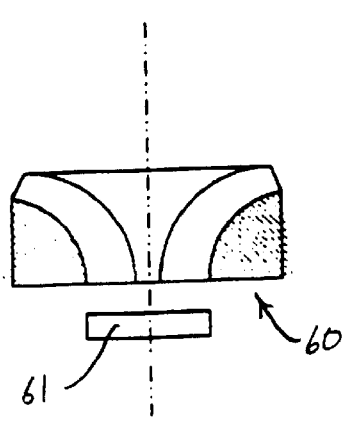
FIG. 6 is a simplified schematic illustration of a curved hollow multi-tube arrangement where the tubes are directed in opposing directions and the entrance apertures are shaped to effect desired respective light entry characteristics.
Figure 7:
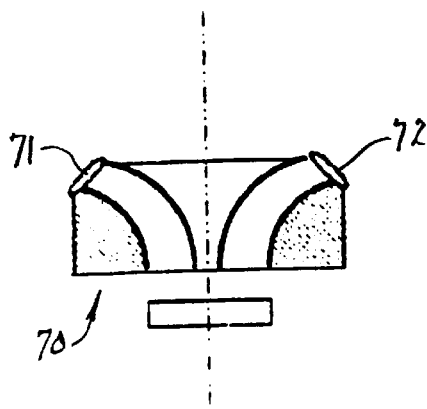
FIG. 7 is a simplified schematic illustration of a curved hollow multi-tube arrangement where the tubes are directed in opposing directions the entrance apertures are provided with lenses to effect desired light entry characteristics.

FIGS. 6 and 7 illustrate detector systems 60 and 70, respectively, that achieve directionally dependent sensitivity. The system of FIG. 6 uses a complex form of cylindrical geometry (a generalized tube) to achieve its predetermined response characteristic. It could be made very inexpensively. The second kind of system, i.e., detector system 70 shown in FIG. 7, uses annular lenses 71 and 72 to achieve its angular sensitivity. In FIG. 6, the system uses the shape and angle of the entrance aperture plus the curved tube to direct the received portion of the ambient light to a light sensor 61. The tube walls could be reflecting, diffusely scattering, or colored to achieve a desired predetermined spectral sensitivity.

In detector system 70 shown in FIG. 7, the annular lenses are disposed at the light entrances of the sensor.

For many of the systems described herein, there is no requirement that they have cylindrical symmetry as, for example, those in FIGS. 6 and 7. The shape of the opening does not have to be azimuthally symmetrical, and neither does the lens have to be azimuthally symmetrical. In this way it is possible to achieve different angular sensitivity over the whole sky.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for dectecting an ambient electromagnetic energy, the arrangement comprising:
   a photodetector having a photodetector input for receiving electromagnetic energy, and a photodectector output for producing an electrical characteristic responsive to the electromagnetic energy; and a hollow conduit having a lumen, a first end that is open to the lumen and arranged to receive a received portion of the ambient electromagnetic energy, and a second end that is open to the lumen and arranged in the vicinity of the photodetector input, said hollow conduit having a polished interior surface, and length and radius dimensional characteristic that are predetermined to effect a desired combination of a first portion of the received portion of the electromagnetic energy that impinges upon an interior surface of said hollow conduit, and a second portion of the received portion of the electromagnetic energy that propagates directly through the lumen of said hollow conduit, whereby a portion of the received potion of the ambient electromagnetic energy impinges upon the photodetector input, the first end that is open to the lumen being configured to effect a predetermined directional sensitivity to the arrangement corresponding to a predetermined combination of the first and second portions of the received portion of the electromagnetic energy.

2. The arrangement of claim 1, wherein the first end that is open to the lumen of said hollow conduit is terminated orthogonal to an axis of the first end.

3. The arrangement of claim 1, wherein there is further provided a diffuser in the vicinity of the first end of said hollow conduit.

4. The arrangement of claim 1, wherein the first end that is open to the lumen of said hollow conduit is terminated at an angle other than orthogonal with respect to an axis of the first end, whereby the received portion of the electromagnetic energy has a magnitude that varies in response to the direction of incidence thereof with respect to the axis of the lumen said hollow conduit at the first end thereof.

5. The arrangement of claim 4, wherein there is further provided a diffuser in the vicinity of the first end of said hollow conduit.

6. The arrangement of claim 1, wherein there is further provided light blocker means arranged in the vicinity of the first end of said hollow conduit, whereby the received portion of the electromagnetic energy has a magnitude that varies in response to the direction of incidence thereof with respect to the axis of the lumen of said hollow conduit at the first end thereof.

7. The arrangement of claim 6, wherein there is further provided a diffuser in the vicinity of the first end of said hollow conduit.

8. The arrangement of claim 1, wherein said hollow conduit has an interior surface that is adapted to impart a predetermined spectral characteristic to the portion of the received portion of the electromagnetic energy that impinges upon said interior surface.

9. The arrangement of claim 8, wherein the predetermined spectral characteristic corresponds to a predetermined spectral response of a human eye.

10. The arrangement of claim 1, wherein said hollow conduit has a determined radius of curvature.

11. The arrangement of claim 1, wherein there are provided:
a further photodetector having a further photodetector input for receiving further electromagnetic energy, and a further photodetector output for producing a further electrical characteristic responsive to the further electromagnetic energy; and
a further hollow conduit having a respective first end arranged to receive a further received portion of the ambient electromagnetic energy, the further received portion of the ambient electromagnetic energy corresponding to ambient electromagnetic energy that is incident from a direction other than that which impinges upon the first end of said hollow conduit, and a respective second end arranged in the vicinity of the further photodector input, whereby a portion of the further received potion of the ambient electromagnetic energy impinges upon the further photodetector input.

12. The arrangement of claim 11, wherein said hollow conduit and said further hollow conduit each have a respectively associated spectral characteristic.

13. The arrangement of claim 1, wherein there is further provided a lens disposed in the vicinity of the first end of said hollow conduit.

14. The arrangement of claim 13, wherein said lens is an annular lens having a determined angular sensitivity.

15. An arrangement for detecting an ambient light, the arrangement comprising:
a photodetector having a photodetector input for receiving the ambient light, and a photodetector output for producing an electrical characteristic responsive to the ambient light;
a hollow conduit having a lumen, a first end that is open to the lumen and arranged to receive a received portion of the ambient light, and a second end arranged in the vicinity of the photodetector input, said hollow conduit having polished interior surface, and length and radius dimensional characteristics that are predetermined to effect a desired combination of a first portion of the received portion of the electromagnetic energy that impinges upon an interior surface of said hollow conduit, and a second portion of the received portion of the electromagnetic energy that propagates directly through the lumen of said hollow conduit, whereby a portion of the received potion of the ambient light impinges upon the photodetector input, the first end that is open to the lumen being configured to effect a predetermined directional sensitivity to the arrangement corresponding to a predetermined combination of the first and second portions of the received portion of the electromagnetic energy; and
light modulator means disposed at the first end that is open to the lumen of said hollow conduit for imparting a directional sensitivity characteristic to the received portion of the ambient light.

16. The arrangement of claim 15, wherein said light modulator means is integrally formed with said hollow conduit.

17. The arrangement of claim 16, wherein said light modulator means comprises a predetermined angular termination at the first end of said hollow conduit.

18. The arrangement of claim 15, wherein said light modulator means comprises a lens.

19. The arrangement of claim 18, wherein said lens comprises an annular lens.

20. The arrangement of claim 15, wherein said light modulator means comprises an axially protruding portion having an axial dimension that varies with angular position about an axis of said hollow conduit.

21. The arrangement of claim 15, wherein said hollow conduit has an interior surface extending along at least a portion of its length, said interior surface having a predetermined surface finish.

22. The arrangement of claim 21, wherein said interior surface finish has a predetermined spectral characteristic.

23. The arrangement of claim 15, wherein there is further provided a diffuser arranged in the vicinity of the first end of said hollow conduit for dispersing the ambient light.

24. A method of propagating ambient light from a first location to a second location where a photodectector is disposed, the method comprising the step of:

receiving a portion of the ambient light at a first end of a hollow conduit having lumen and a polished interior surface;

controlling an angular sensitivity of the received portion of the light in relation to the lumen of the hollow conduit;

propagating the received portion of the ambient light along the lumen of the hollow conduit, the lumen of the hollow conduit having length and radius dimensional characteristics that are predetermined to effect a desired combination of a first portion of the received portion of the electromagnetic energy that impinges upon an interior surface of said hollow conduit, and a second portion of the received portion of the electromagnetic energy that propagates directly through the lumen of the hollow conduit; and producing an electrical signal responsive to the received portion of the ambient light, after performing the step of propagating.

25. The method of claim 24, wherein there is further provided the step of modulating a spectral characteristic of the received portion of the ambient light during the step of propagating.

26. The method of claim 24, wherein there is further provided the step of diffusing the received portion of the ambient light.

27. The method of claim 24, wherein said step of controlling comprises the step of propagating the received portion of the ambient light through a lens.

28. The method of claim 24, wherein said step of propagating the received portion of the ambient light along the hollow conduit comprises the step of causing the received portion of the ambient light to impinge upon an internal surface of the hollow conduit.

29. The method of claim 28, wherein there is further provided the step of controlling a proportion of the received portion of the ambient light that impinges upon the internal surface of the hollow conduit.

* * * * *